United States Patent [19]
Frushour et al.

[11] 3,902,762
[45] Sept. 2, 1975

[54] PEANUT COMBINE COLLECTION BOX AND FILLING SYSTEM THEREFOR

[75] Inventors: George Victor Frushour; Marvin Lee Nafziger, both of Albany, Ga.

[73] Assignee: Lilliston Corporation, Albany, Ga.

[22] Filed: Feb. 12, 1973

[21] Appl. No.: 331,639

[52] U.S. Cl. .................... 302/59; 214/508; 302/61
[51] Int. Cl.² ........................................ B65G 53/40
[58] Field of Search ... 214/501, 508; 302/37, 59–61

[56] References Cited
UNITED STATES PATENTS

| | | | |
|---|---|---|---|
| 568,776 | 10/1896 | Leggett | 302/61 X |
| 1,339,240 | 5/1920 | Travis | 302/59 |
| 2,487,411 | 11/1949 | Balbi | 214/508 |
| 2,650,136 | 8/1953 | Raleigh | 302/60 |
| 2,674,498 | 4/1954 | Thayer | 302/59 |
| 2,929,112 | 3/1960 | Massey et al. | 302/59 X |
| 3,092,272 | 6/1963 | Weigel | 214/501 |
| 3,214,222 | 10/1965 | Nickla | 302/59 |
| 3,257,151 | 6/1966 | Sprackling | 302/59 |
| 3,744,653 | 7/1973 | Jensen | 214/508 X |

*Primary Examiner*—Evon C. Blunk
*Assistant Examiner*—Jeffrey V. Nase
*Attorney, Agent, or Firm*—Newton, Hopkins & Ormsby

[57] ABSTRACT

The collection box of a peanut combine is provided with a delivery system which delivers two separate streams of airborne peanuts to the fore and aft corners of the box at the blind side of the box. The inlet side of the box is opposite the blind side and contains an arcuate, fan-like discharge horn into which the two peanut streams are discharged. The bottom inlet opening of the box rests upon and registers with an upwardly inclined duct which contains a flow-splitting wedge-like step.

7 Claims, 4 Drawing Figures

PATENTED SEP 2 1975

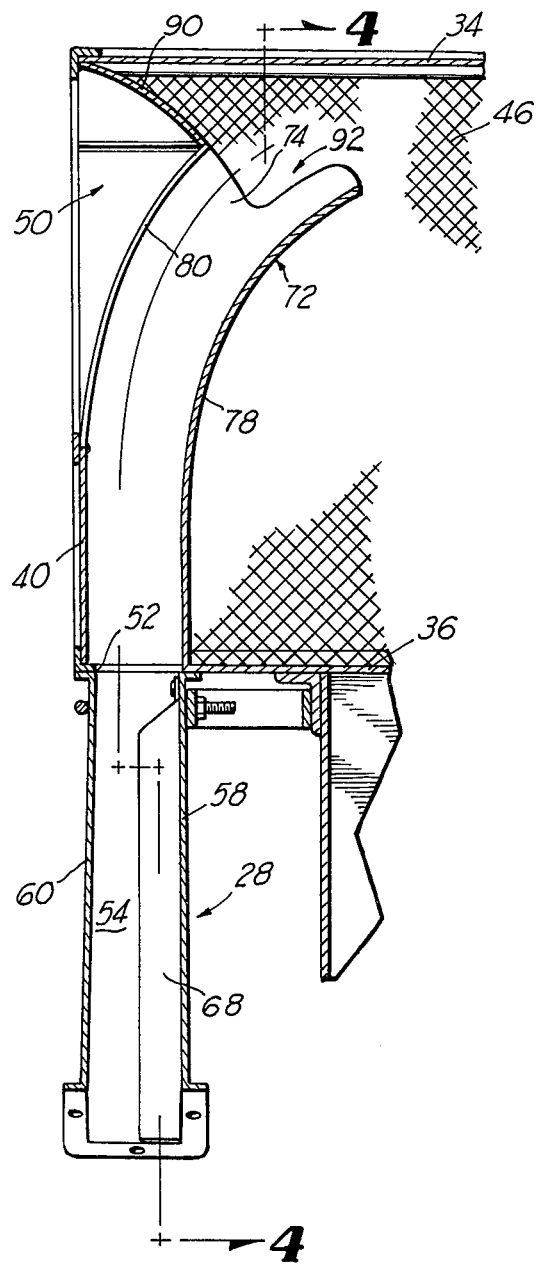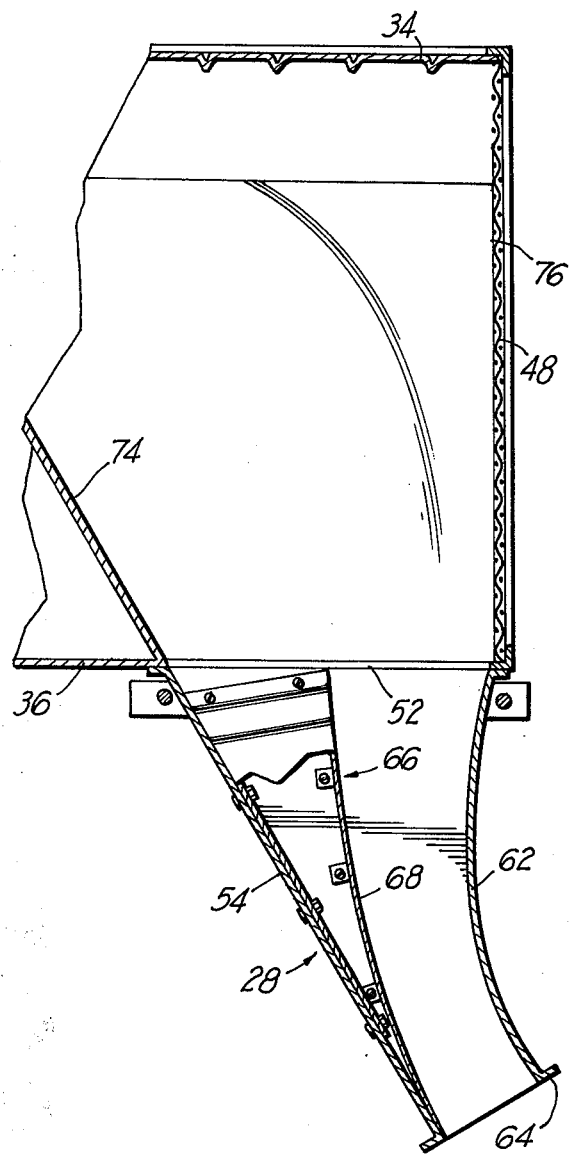

PEANUT COMBINE COLLECTION BOX AND FILLING SYSTEM THEREFOR

BACKGROUND OF THE INVENTION

Peanuts after separation from their vines in a peanut combine have a rather low bulk density which allows them easily to be conveyed by entrainment in a moving stream of air. The collection box to which they are conveyed should be located high enough to allow the peanuts to be dumped directly into a truck or other transport vehicle between which and the combine periodic visits are effected to off-load the accumulated crop. In order to make a compact and efficient arrangement on the combine it would be desirable to convey the peanuts to the collection box upwardly through the bottom of the latter. However, it is difficult to obtain an efficient degree of collection box filling if the peanuts are air-conveyed to the box in this manner.

BRIEF SUMMARY OF THE INVENTION

The present invention involves a collection box-peanut delivery system in which the peanuts are conveyed by a moving stream of air upwardly through the bottom of a collector box while achieving efficient filling of the collector box. The box defines a generally rectangular enclosure having a bottom inlet at one side so that the opposite side is blind. The delivery means causes two principal streams of peanuts to enter upwardly through the inlet opening and arch into the opposite corners at the blind side of the enclosure. The arching paths are effected by an upstanding discharge horn in the box and stream separation is effected by a duct section having a wedge-like separator step upstream of the discharge horn.

BRIEF DESCRIPTION OF THE DRAWINGS

FIG. 3 is an enlarged transverse sectional view taken through the assembly of FIG. 2; and FIG. 4 is a sectional view substantially along the plane of section line 4—4 in FIG. 3.

DETAILED DESCRIPTION OF THE INVENTION

Figure 1:
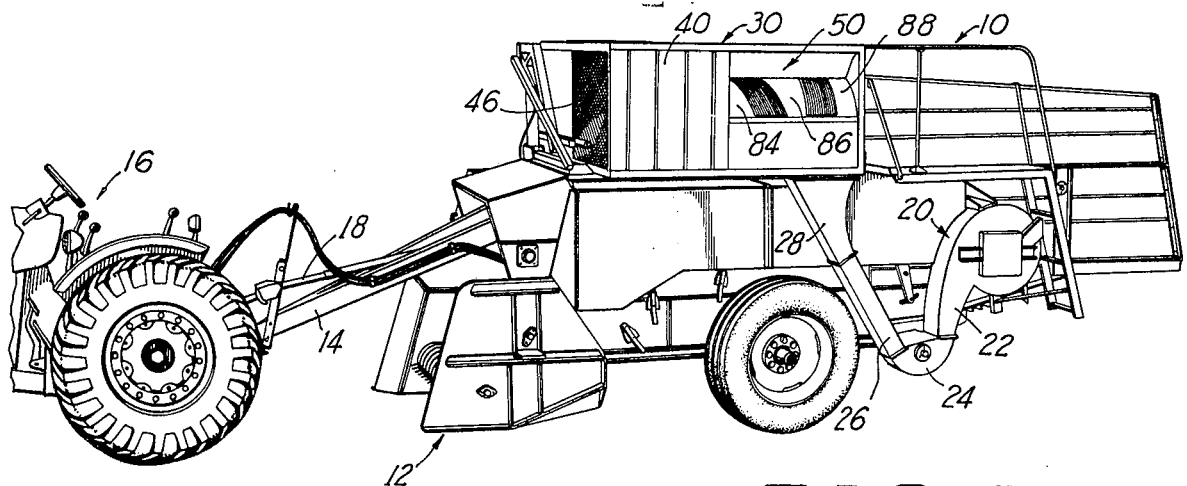
FIG. 1 is a perspective view showing a peanut combine embodying the system of the present invention.

In FIG. 1, the reference character 10 indicates in general a peanut combine arrangement which includes a pick-up head indicated generally by the reference character 12 which funnels in and picks up the peanut vines with peanuts attached for commencement of the separating action effected by the combine 10. The combine includes a tongue or draft bar 14 which is to be attached to the draw bar of an associated tractor indicated generally by the reference character 16, which tractor is provided with the usual power take-off shaft assembly to which the power shaft 18 of the combine is attached so that the combining action is powered from the tractor in the conventional manner.

Details of the combine itself are of no moment insofar as the present invention is concerned and are not described herein further in detail. However, part of the powered mechanism of the combine includes an air blower indicated generally by the reference character 20 which includes an air discharge duct or snout 22 leading to the housing 24 to which peanuts after separation from their vines are delivered by the combine. The stream of relatively high velocity air issuing through the discharge snout 22 passes through the housing 24 to pick up and entrain the separated peanuts therein and convey them upwardly through the duct portion 26 as shown which leads into the duct section 28 hereinafter more particularly described.

The collection box according to the present invention is shown generally at 30 in FIG. 1 and will be seen to reside on the top-forward section of the combine and preferably is mounted so as to be tilted to the far side thereof (as viewed in FIG. 1) for discharging the contents of the collection box to a truck or other transport vehicle when the collection box is off-loaded.

Figure 2:
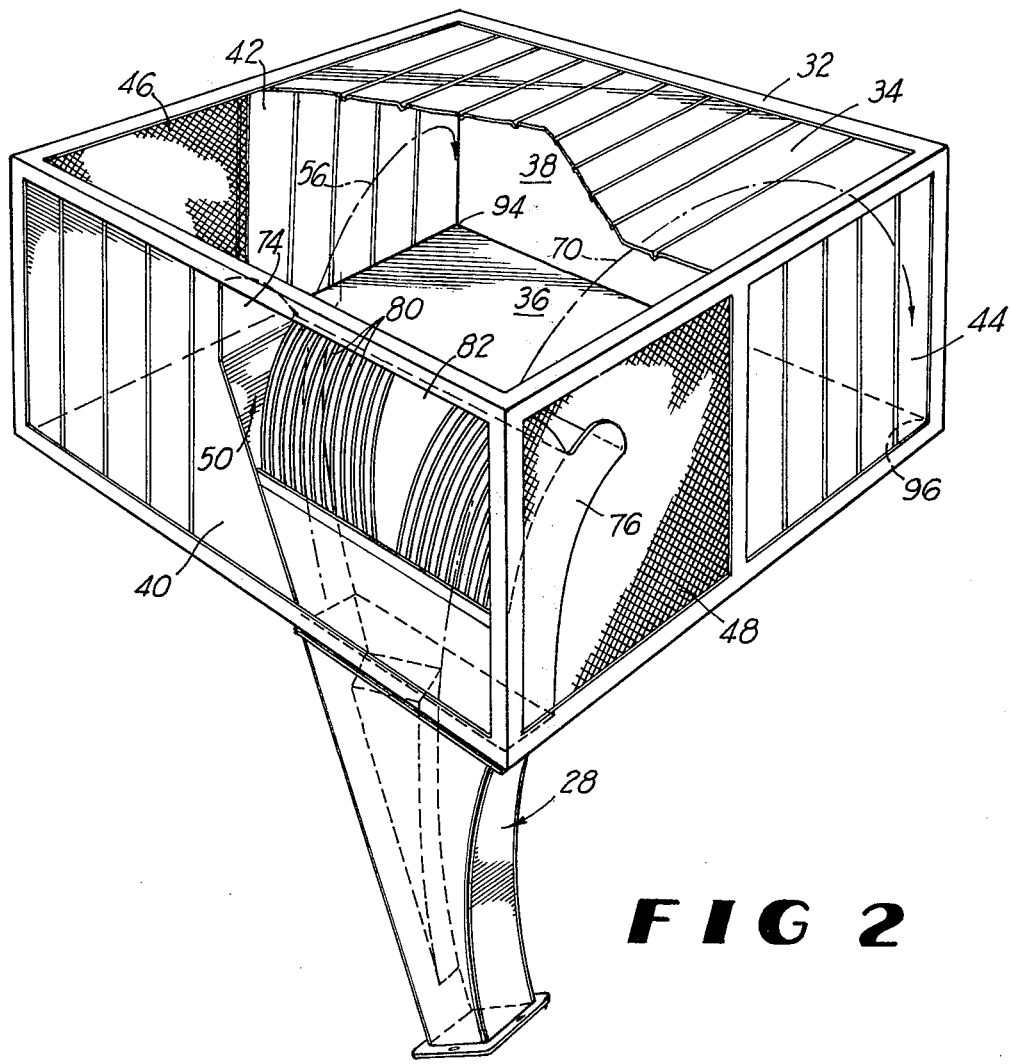
FIG. 2 is an enlarged perspective view, partly broken away, illustrating the collection box and duct section according to the present invention.

An illustrative embodiment of the collection box is shown in FIG. 2 wherein it will be seen that a rectangular edge frame construction 32 supports a top wall 34, a bottom wall 36, a blind side wall 38, an outer side wall 40, a forward wall 42 and a rear wall 44. The front and rear walls 42 and 44 are formed in part by the foraminous portions 46 and 48 and the outer side wall 40 is provided with an opening 50, the purpose of which will be presently apparent. The orientation of the collector box will be evident by reference to the numerals employed in FIG. 2. The collector box defines an enclosure into which the separated peanuts are discharged and accumulate and it is a particular feature of the present invention that a very compact arrangement is provided with a bottom-fed collector box to which separated peanuts are delivered by entrainment in a moving stream of air, the peanuts being delivered by the means 20, 24 and 26 as previously described to the duct section 28 which is also shown in FIG. 2.

As can be seen in FIGS. 3 and 4, the bottom wall 36 of the collector box is provided with a rectangular opening 52 with which the upper extremity of the duct section 28 registers, it being understood, however, that the collector box merely rests upon the duct section 28 and is not attached thereto, thus allowing the collector box to be pivoted to one side for dumping. As previously described, a linkage arrangement for effecting this dumping action is disclosed in copending application Ser. No. 336,202, filed Feb. 27, 1973 and now U.S. Pat. No. 3,846,964. and the structure thereof is incorporated herein by reference. For the sake of written description herein, suffice it to say that the blind side wall 38 is pivoted along its lower edge to the bottom wall 36 with the linkage arrangement being such that when the box is in dumping position, the bottom wall is tilted downwardly with the wall 38 essentially parallel therewith so as to form a pouring spout for the collection box.

The duct section 28 includes an upwardly inclined forward side wall section 54 which is inclined at substantially the same angle as is the duct 26 in FIG. 1 and the angularity of the duct 26 and of the wall 54 is such as tends naturally to create a stream of peanuts entering into the collection box which ultimately will follow the principal stream path indicated by the chain dash line 56 in FIG. 2. The inner and outer walls 58 and 60 of the duct section 28 are essentially parallel as is shown in FIG. 3 and the rearward side wall 62 is arcuated as illustrated to define a diverging flow path from the flange section 64 where the duct section 28 is joined to the duct 26, the cross section of the flow path at the flange 64 being the same as the cross section throughout the duct 26. Just below the inlet opening 52 in the outside rear corner of the collector box a flow splitting device 66 is provided, same being as shown of generally wedge-like configuration having a deflector wall portion 68 which encompasses approximately ½ the width of the cross section of the duct section 28 as is illustrated in FIG. 3 so as to intercept and deflect substantially ½ of the stream of peanuts flowing in the duct 26 and entering the section 28 so as to cause them ultimately to follow the path indicated by the chain dash line 70 in FIG. 2.

Within the aforesaid corner of the collection box there is provided a discharge horn assembly indicated generally by the reference character 72 defined between the forward and rearward upwardly divergent end walls 74 and 76, the former of which effects in essence a continuation of the wall section 54 and the latter of which is disposed in vertical disposition contiguous to the foraminous section 48 of the rear side wall 44 as is clearly evident in FIG. 4. The discharge horn further includes the inner side wall 78 which extends upwardly and then arcuately as illustrated, the aforesaid opening 50 in the outer side wall 40 of the box being opposite the upper region of the discharge horn as is shown in FIG. 3. To complete the discharge horn assembly, there are provided a series of separate deflecting fingers 80 defining open spaces therebetween and there may be provided additionally intervening wall portions such as the wall portion 82 in FIG. 2 or the several wall portions 84, 86 and 88 in FIG. 1 and an arcuate air deflector wall 90 extends between the cusped upper edges of the walls 74 and 76 closely adjacent the inner side of the front wall 40 as is illustrated in FIG. 3 to direct air discharged between the fingers 80 laterally outwardly through the opening 50.

The discharge mouth 92 of the discharge horn 72 is located near the upper region of the enclosure defined by the collection box and is directed inwardly toward the blind side wall 38. The inclination of the wall portions 54 and 74 and of the splitter wall 68 are such as causes the peanuts to separate or divide into two principal streams which after passing through the discharge horn 72 and out of the mouth 92 thereof follow essentially the two principal paths 56 and 70 as is illustrated in FIG. 2 which arch toward the fore and aft inner side corners 94 and 96 of the box. Thus, the two streams of peanuts tend initially to pile at these corners. The constant shaking and vertical motions naturally imparted to the combine by its travel over the rough ground surface tends to shake down these piles and to spread them apart to fill in between them while the streams of peanuts still discharge very close beneath the underside of the top 34 continuously to pile and ultimately substantially completely to fill into and against the blind side of the collector box. Continued filling of the box causes the streams to be intercepted by the already piled material and the filling will continue until substantially the entire contents of the collector box are filled, the discharge horn 72 acting, in this capacity, more or less in the nature of a stand pipe which continuously feeds the material in fanned-out relationship within the box at or near the upper region thereof.

What is claimed is:

1. A collection box for peanut combines comprising, in combination:

a bottom wall, a top wall, and two opposite pairs of side walls defining a generally rectangular enclosure, one of which side walls is hingedly mounted to provide a discharge door, said bottom wall having an inlet opening at one corner thereof defined by intersecting side walls of the two pairs thereof at the opposite side from said door; and a discharge horn having an upwardly inclined forward wall extending upwardly from one side of said inlet opening and along one of said side walls defining said corner, a vertical rear wall extending upwardly from the opposite side of said inlet opening parallel to and contiguous with the other side wall defining said one corner, an arcuate side wall spaced from said one side wall and joining said forward and rear walls, said one side wall having an air discharge opening opposite the upper region of said arcuate side wall, and a series of arcuate fingers extending arcuately from the lower side of said air discharge opening generally parallel to said upper region of said arcuate side wall, whereby to define a discharge mouth below said top wall.

2. In a peanut combine having receiver means for peanuts separated from their vines;

a collection box disposed in elevated position above said receiver means, said collection box having fore and aft upstanding end walls, a top wall and a bottom wall, an upstanding fore-and-aft extending inlet side wall and an upstanding fore-and-aft extending discharge door opposite said inlet side wall;

air blower means for directing a stream of air through said receiver means to pick up and convey separated peanuts therefrom;

a duct leading upwardly from said receiver means to the bottom of said collection box at said inlet side thereof and adjacent said aft end wall;

said collection box having a bottom inlet opening registering with said duct and a discharge horn leading upwardly from said inlet opening to terminate near the upper region of the enclosure defined by the collection box so as to form a stand pipe and fanning widthwise thereof, said discharge horn having an arched roof region presenting a discharge mouth near said upper region of the enclosure for directing peanuts generally toward said discharge door of the collection box and close beneath said top wall, said discharge horn having an upwardly inclined forward wall leading upwardly and forwardly from said inlet opening and cooperating with said arched roof region to direct peanuts toward said door adjacent the forward end of the collection box;

said duct having a forward wall leading from said receiver means to said inlet opening and being inclined forwardly to merge smoothly with said forward wall of said discharge horn, and means in said duct for splitting the stream of peanuts flowing therein into two principal streams directed to the opposite side regions of the fanned discharge horn, said means for splitting comprising a wedge-like deflector having a wall portion which encompasses substantially ½ the width of said forward wall of the duct and forms a step therewith directing substantially ½ of the peanuts substantially vertically through said inlet opening to engage said arched roof region and direct peanuts toward said door adjacent the rearward end of said collection box whereby the streams of peanuts pile initially at the fore and aft corners of the collection box against said door.

3. In a peanut combine having a peanut collection box disposed in elevated position for ease of dumping the contents of said box into a separate transport vehicle, said collection box having a shallow depth in relation to its width and length whereby to present a low profile and defining an enclosure having a top and an inlet side and a side discharge door presenting a blind side opposite to the inlet side; means for transporting peanuts in a stream of moving air upwardly toward said collection box and into said inlet side thereof; and means for deflecting the peanuts being transported into two principal streams directed toward opposite ends of said blind side of the enclosure, said means for deflecting including a discharge mouth located near the upper region of the enclosure defined by said collection box whereby the two streams of peanuts flow very close beneath said top of the box initially to pile at the opposite ends of said discharge door, said means for deflecting including a discharge horn disposed in upstanding position in said enclosure, said collection box having a bottom inlet opening and said discharge horn having a base portion leading upwardly from such inlet opening, said discharge horn also having an arcuate guide region arching over said inlet opening; said means for deflecting including a duct section immediately below said inlet opening having relatively stepped portions for dividing the stream of peanuts into said two principal streams; and said arcuate guide region of the discharge horn being in the form of a series of separate arcuate fingers allowing the moving air to discharge therethrough.

4. In a peanut combine as defined in claim 3 wherein said collection box normally rests upon said duct section to register said inlet opening therewith and is movable out of registry with said duct section to a peanut dumping position.

5. In a peanut combine having a peanut collection box disposed in elevated position for each of dumping the contents of said box into a separate transport vehicle, said collection box having a shallow depth in relation to its width and length whereby to present a low profile and defining an enclosure having a top and an inlet side and a side discharge door presenting a blind side opposite to the inlet side; means for transporting peanuts in a stream of moving air upwardly toward said collection box and into said inlet side thereof; and means for deflecting the peanuts being transported into two principal streams directed toward opposite ends of said blind side of the enclosure, said means for deflecting including a discharge mouth located near the upper region of the enclosure defined by said collection box whereby the two streams of peanuts flow very close beneath said top of the box initially to pile at the opposite ends of said discharge door; said means for deflecting including a discharge horn disposed in upstanding position in said enclosure, said collection box having a bottom inlet opening and said discharge horn having a base portion leading upwardly from such inlet opening, said discharge horn also having an arcuate guide region arching over said inlet opening; and said arcuate guide region of the discharge horn being in the form of a series of separate arcuate fingers allowing the moving air to discharge therethrough.

6. In a peanut combine as defined in claim 5 wherein said discharge horn is located in one corner of said collection box at said inlet side thereof.

7. In a peanut combine as defined in claim 5 wherein said means for deflecting includes a duct section immediately below said inlet opening having relatively stepped portions for dividing the stream of peanuts into said two principal streams.

* * * * *